United States Patent [19]
Swist

[11] Patent Number: 5,360,381
[45] Date of Patent: Nov. 1, 1994

[54] AUTOMATIC CLUTCH CONTROL

[76] Inventor: Jason Swist, 2525 Sun Life Place, 10123 - 99 Street, Edmonton, Alberta, Canada, T5J 3H1

[21] Appl. No.: 856,064

[22] PCT Filed: Nov. 9, 1990

[86] PCT No.: PCT/CA90/00395
§ 371 Date: Jun. 19, 1992
§ 102(e) Date: Jun. 11, 1992

[87] PCT Pub. No.: WO91/07293
PCT Pub. Date: May 30, 1991

[30] Foreign Application Priority Data
Nov. 10, 1989 [CA] Canada .................. 2003894

[51] Int. Cl.$^5$ .................................. B60K 41/02
[52] U.S. Cl. ........................... 477/175; 192/103 R; 477/78; 477/86; 477/180
[58] Field of Search ........... 192/0.076, 0.092, 0.052, 192/0.033, 103 R

[56] References Cited

U.S. PATENT DOCUMENTS

| | | | |
|---|---|---|---|
| 4,294,341 | 10/1981 | Swart | 192/0.076 X |
| 4,366,889 | 1/1983 | Wang | 192/0.092 |
| 4,401,200 | 8/1983 | Heidemeyer et al. | 192/0.076 |
| 4,542,665 | 9/1985 | Yamamuro et al | 74/866 |
| 4,583,627 | 4/1986 | Kumura et al. | 192/0.076 |
| 4,591,038 | 5/1986 | Asagi et al. | 192/0.073 |
| 4,629,045 | 12/1986 | Kasai et al. | 192/0.052 |
| 4,633,985 | 1/1987 | Leorat | 192/0.076 X |
| 4,730,708 | 3/1988 | Hamano et al. | 192/0.033 |
| 4,766,988 | 8/1988 | Seibert | 192/0.055 |
| 4,947,970 | 8/1990 | Miller et al. | 192/0.076 |
| 5,147,254 | 9/1992 | Baier et al. | 192/0.076 X |

*Primary Examiner*—Charles A. Marmor
*Assistant Examiner*—Andrea Pitts
*Attorney, Agent, or Firm*—Seed and Berry

[57] ABSTRACT

A control for enabling a clutch to be automatically engaged with a power source. An apparatus for automatically controlling the position of a clutch between a power source and a drive train characterized by a control which regulates pressure to a clutch engaging member according to performance criteria of the power source.

21 Claims, 8 Drawing Sheets

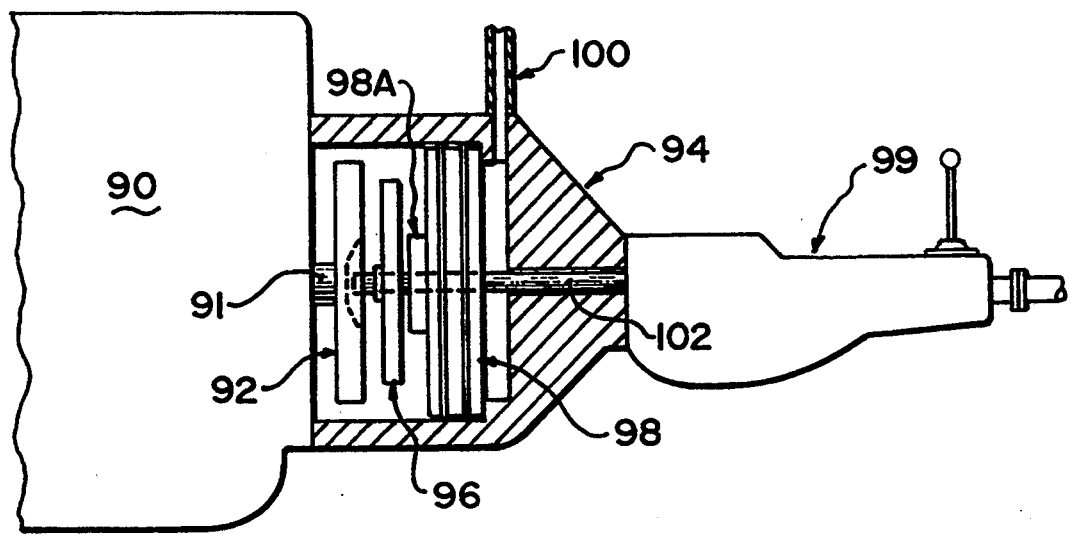
FIG. 11
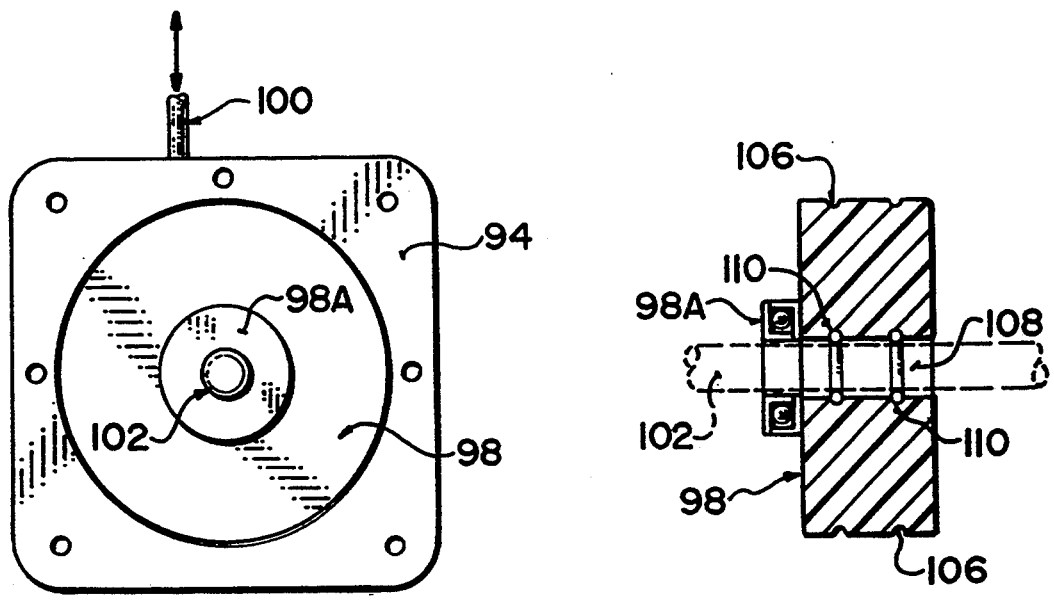
FIG. 12
FIG. 14
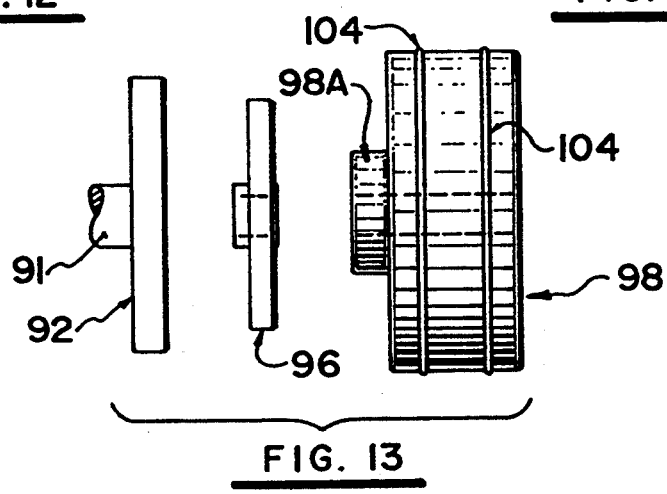
FIG. 13

AUTOMATIC CLUTCH CONTROL

This invention pertains to a control for enabling a clutch to be automatically engaged to or disengaged from a power source.

Persons operating a standard transmission of a powered vehicle must smoothly operate a manual clutch to engage or disengage the power source with the wheel drive train of the vehicle. Many drivers prefer to avoid clutches by driving vehicles with automatic transmissions. However, vehicles with clutches are usually more economical to operate. Also, clutches provide a positive link with the power source which is usually preferred in racing vehicles. A drive system which would enable a clutch to be automatically engaged with the power source would be useful compromise between automatic transmissions and manually operated clutches.

The invention provides a programmed automatic control for motorcycle and motor vehicle mechanical clutches. The control senses one or more variables such as throttle position, engine RPM, engine load, pressure on the clutch friction plates, and other variables independent of the rider or driver, and enables the clutch to be engaged or disengaged according to one or more of those variables. No conventional manually operated clutch engagement pedal or handle is required. Gear shifting can be performed by operating the throttle and the gear shift control simultaneously. The control can have either a hydraulic, pneumatic or electrical pressure plate (ram) which automatically varies the pressure on the clutch friction plates according to throttle position, engine speed, load and other factors. The invention allows for optimum performance, economy and reliability on all clutched vehicles while simplifying usage. It is easily adapted to existing systems.

An apparatus for automatically controlling the position of a clutch between a power source and a drive train, characterized by a control which regulates pressure to a clutch engaging member according to sensed conditions relating to the power source. An apparatus for automatically controlling the position of a pressure actuated multiple plate clutch in a housing between a power source and a drive train of a vehicle characterized by a control which regulates air pressure generated by an air compressor mounted on the vehicle to a clutch engaging member adjacent to the clutch according to a performance variable of the power source.

In the drawings:

FIG. 11 illustrates a side partial section view of an automobile engine and manual shift transmission equipped with the pressure plate actuator of the automatic clutch;

FIG. 12 illustrates an end elevation of a manual shift transmission showing the pressure plate (ram) actuator and other components;

FIG. 13 illustrates a side elevation exploded view of the ram and clutch disc of a manual transmission; and, FIG. 14 illustrates a side section view of a transmission ram.

The invention pertains to an apparatus and a method for automating a mechanical clutch by using a combination of programmed electronic controls and sensors, electronic and pneumatic (or hydraulic) pumping and clutch engagement mechanisms, including an air cylinder or air pressure reservoir if a pneumatic system is used, to control and engage the clutch when the throttle to the power source is opened or other power source performance variables dictate, and to disengage the clutch when the throttle is closed, or other power source performance variables require. The invention can be used on virtually any conventional manual clutch apparatus including motorcycles or larger manual clutch vehicles such as automobiles and trucks.

By way of example, in one embodiment, clutch engagement can be related to throttle position. In another embodiment, the engagement or disengagement of the clutch can be related to engine speed. For example, the clutch may engage at engine speeds above 1200 RPM. In yet a third embodiment, the clutch engagement may be related to engine load above a certain level. Combinations of two or three of these embodiments may be used. Other engine performance criteria can also be sensed and computer controlled to regulate clutch engagement.

The following description in association with the drawings relates to a programmed electronic, electrical, pneumatic automatic clutch control for a motorcycle and an automobile. However, these are exemplary only because the control can be used in virtually any situation where there is an engine (power source) and a clutch.

Figure 1:
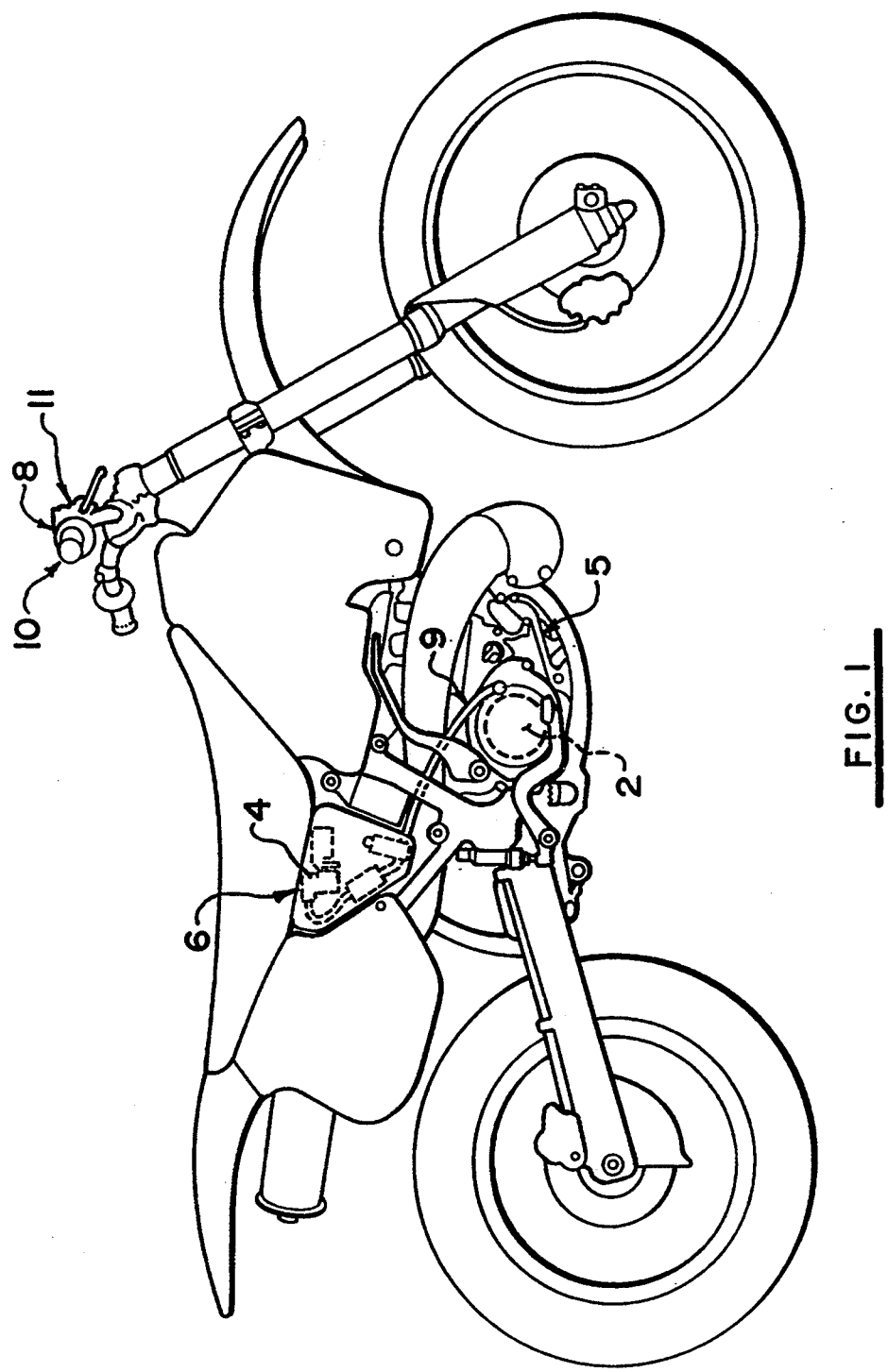
FIG. 1 illustrates a side view of a motorcycle equipped with the automatic clutch control.

FIG. 1 shows a side view of a motorcycle equipped with a standard transmission and an automatic clutch control according to one embodiment of the invention, where throttle position is related to clutch position. The apparatus includes a clutch pressure plate actuator 2 (housed inside a clutch housing 14), an engine 5, a computerized control box 6 which houses an air motor 4a, pump 4b and reservoir 4c, a computer 12 and a valve 7, which is connected to a throttle switch 8, a throttle housing 10 and an on/off switch 11. The clutch pressure plate actuator 2 controls the transfer of power from the engine 5 to the transmission (not visible). The air reservoir 4c, motor 4a and pump 4b utilize compressed air to activate the clutch pressure plate actuator 2 which in turn applies or releases pressure on the clutch pressure plate 20 (not visible but see FIG. 3) inside the clutch housing 14 through hose 9. Valve 7 controls the flow of air from the air reservoir 4c and pump 4b through hose 9 to the housing 14. Motor 4a activates when the air pressure in the system falls below a predetermined level.

Electrical power from a battery or alternator (not shown) on the motorcycle to the valve 7 is controlled by throttle position switch 8 which is activated by the throttle handle 10. The manual position of the throttle handle 10 from closed to open causes clutch engagement by activating the pressure plate actuator 2. Closing the throttle handle 10 causes clutch disengagement by deactivating the actuator 2. This is done through operation of the throttle position switch 8, the electric valve 7 (which can be a solenoid valve) and air pump motor 4a, pump 4b and reservoir 4c. An optional bleed-off valve (not shown) can be used to control initial clutch slip before the clutch pressure plate actuator 2 and clutch assembly 3 are fully engaged to provide smoother operation. Another option is that clutch engagement can be computer 12 controlled according to engine speed. The computer programming for the computer 12 is conventional. When the engine speed reaches a certain predetermined RPM, the control is programmed to cause the clutch to engage. When engine RPM drops below a prescribed level, the computer control 12 causes the clutch actuator 2 to disengage from the clutch pressure plate. A conventional engine load sensor (not shown) can be mounted on the engine and used to assist in regulating slip of the clutch according to engine load. This provides smoother operation.

Combinations of the clutch engagement control factors can be used. For instance, clutch engagement may be controlled by both throttle position and engine speed. The computer control 12 can be conventionally programmed to sense throttle position and also engine speed, the clutch disengaging at a predetermined engine speed regardless of the position of the throttle. Engine load can be another variable which is sensed, the computer control 12 being conventionally programmed to release the clutch if a certain engine load is reached. Other performance criteria can also be monitored separately or in combination.

Figure 2:
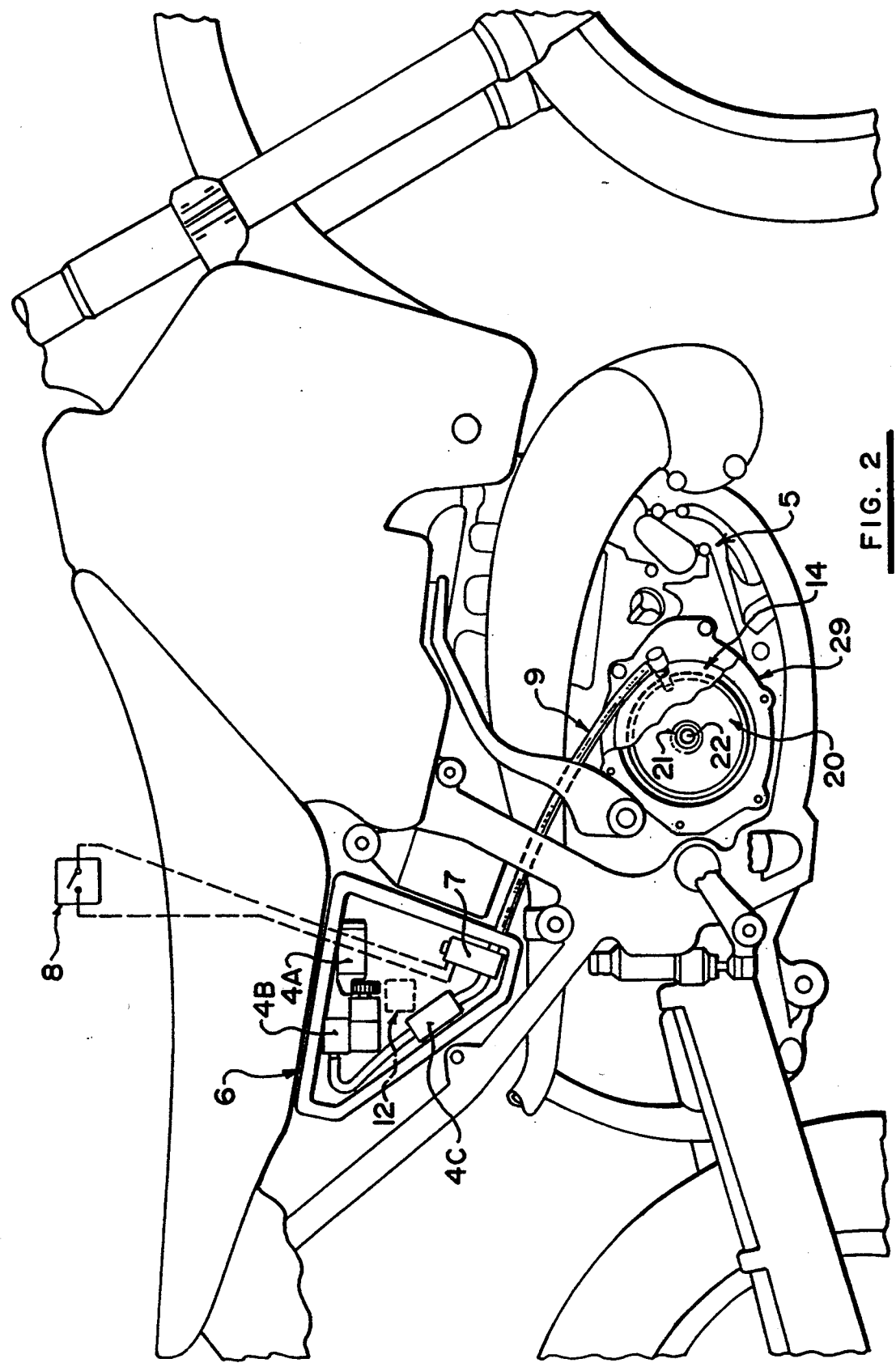
FIG. 2 illustrates detailed side partial section views of the interior of the housings which enclose the pump and solenoid valve and the clutch pressure plate actuator of the automatic clutch control.

FIG. 2 illustrates a detailed side view of the interior of the control box 6, which encloses the motor 4a, pump 4b and reservoir 4c, the solenoid valve 7, and the computer 12. FIG. 2 also illustrates the clutch plate cover 14 and housing which encloses the pressure plate actuator 2, and clutch plate assembly 3 including pressure plate 20. The engine 5 is disengagingly connected to a gear transmission (not visible) by clutch plate assembly 3 and pressure plate actuator 2. The cover plate 14 which has been mostly cut away in FIG. 2, covers plate actuator 2 and clutch plate assembly 3. A hose 9 connects valve 7 with cover pressure plate 14. Air pumped through hose 9 actuates pressure plate actuator 2. Clutch pressure plate 20 and guide hole 22 are also visible in FIG. 2.

The following description relates to the embodiment where clutch engagement is controlled by throttle position and refers to FIGS. 1 and 2. When the on/off switch 11 is on, and the throttle 10 is opened, it activates throttle position switch 8 which is electrically connected to valve 7. Current flows to solenoid valve 7 and causes it to open which allows compressed air from reservoir 4c to flow through hose 9 to housing 14 which activates pressure plate actuator 2. Pressure plate actuator 2 then moves to engage clutch plate assembly 3. The engine 5 is thereby able to transmit rotary power through the clutch plate assembly 3 and transmission to the rear drive wheel of the motorcycle.

When the throttle handle 10 is closed, electrical power to switch 8 is closed. Solenoid valve 7 then closes, which shuts off the air through hose 9 and permits air pressure to bleed from the housing 14 pressure plate actuator 2 system. This drop in air pressure causes the pressure plate actuator 2 to move away from the clutch pressure plate 20 (see FIG. 3) and disengages the clutch assembly 3. At the same time, air compressor pump 4b is started to regenerate air pressure in the reservoir 4c. An air compressor can be used in place of the pump on an automobile because of the larger size.

In another embodiment, clutch assembly 3 engagement can be controlled by having the computer 12 conventionally programmed to sense engine rotation speed by means of a conventional tachometer. Further, an optional engine load sensor (not shown) on the engine 5 can be used to sense the load on the engine 5 and proportionately control the opening and closing of the valve 7 which in turn regulates air flow to the pressure plate actuator 2 thereby either smoothly engaging or disengaging the clutch assembly 3 as the case may be. A useful electronic sensor and computer for sensing factors such as engine RPM, engine load, and optionally compression, temperature, air intake and exhaust velocity, and other possible parameters, is available from MSD, which is a subsidiary of Autotronics, El Paso, Tex., as part number E950C. The optional pump 4b for the air reservoir 4c is commercially available and can be either engine driven or electrical, and supplies the necessary air pressure required to activate the pressure plate actuator 2. An experimental prototype of the overall control system has been tested on a 1991 Honda CR500 motorcycle and a 1991 Yamaha F2R 600 motorcycle. The drawings refer to a 1991 Honda CR500 clutch assembly.

In operation, where clutch engagement is related to throttle position, the gears in the transmission can be shifted by releasing the throttle 10 and moving the gear shift lever (not shown) to the next gear position. Releasing the throttle 10 releases the clutch which then enables the gear to change. Once the next gear is engaged, the throttle is then turned to an open position until the next gear shift is to be made. The process is repeated as many times as is required to efficiently drive the vehicle. In a variation, which would provide smoother operation, a switch can be used in association with the gear shift lever. Moving the gear shift lever turns off the switch momentarily which then closes valve 7, which then closes air through hose 9 and releases air pressure from the housing 14 which then enables the clutch assembly 3 to release. When the shift lever reaches the next gear position, the switch is turned on and the clutch engages. The throttle in this case can remain open because the clutch release is controlled by the gear shift lever switch.

In a third embodiment, clutch engagement can be related to an engine RPM sensor. The standard microcomputer 12 can be conventionally programmed to cause clutch engagement depending upon whether engine RPM rises above or falls below a certain predetermined level.

Figure 3:
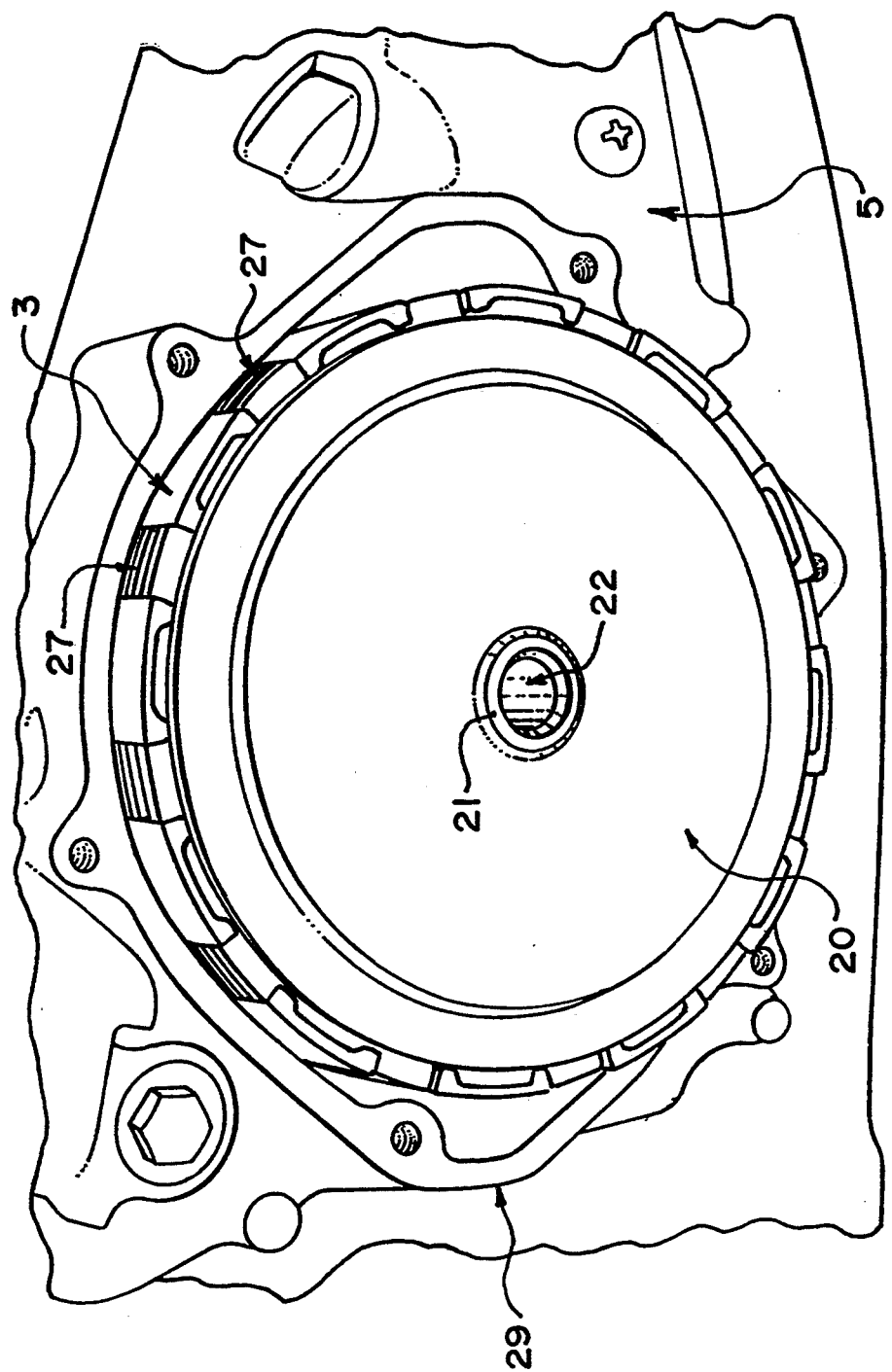
FIG. 3 illustrates an isometric view of a motorcycle clutch pressure plate and clutch disc assembly.

FIG. 3 illustrates an isometric view of a motorcycle clutch plate assembly showing the clutch pressure plate 20, the guide pin hole 22 and rim 21. When pressure plate 20 is moved inwardly, away from the viewer, the clutch assembly of alternating clutch discs 27 and plates (not visible) are compressed together to initiate traction and permit power to be transmitted from the engine 5 to the transmission.

Figure 4:
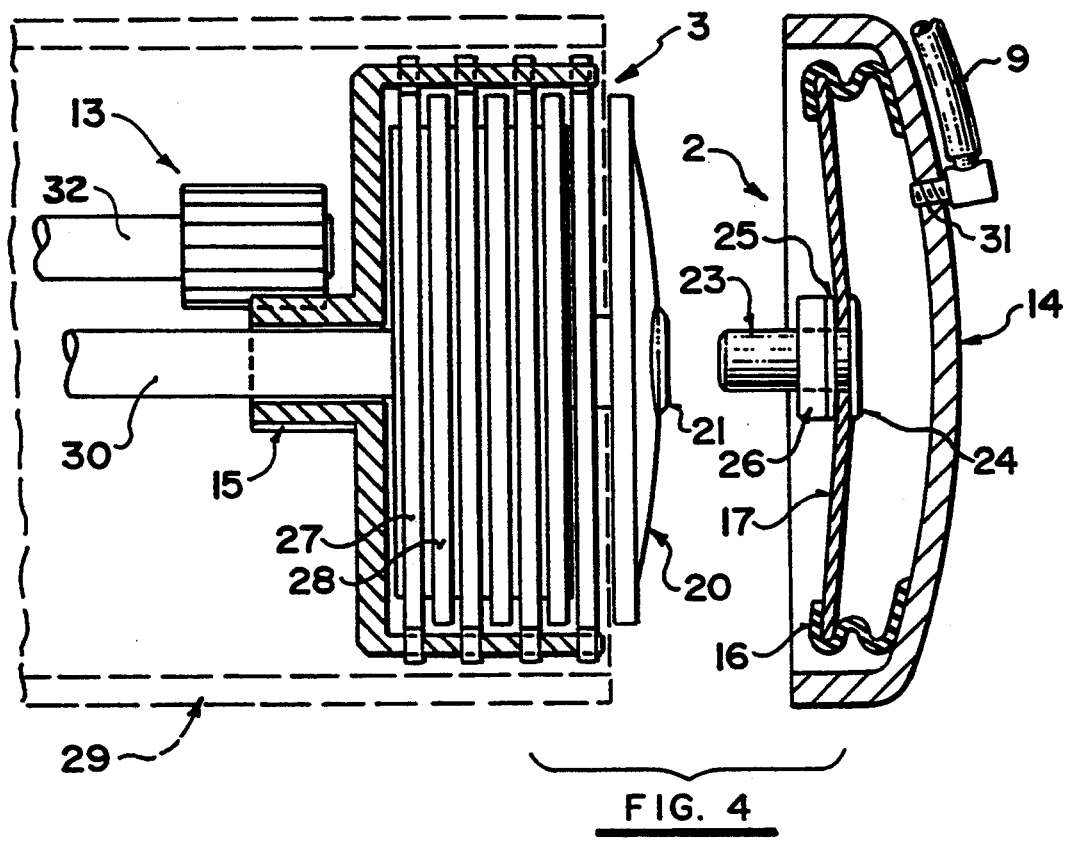
FIG. 4 illustrates a section view of a motorcycle clutch, plate assembly, pressure plate, diaphragm actuator assembly and air supply of the motorcycle automatic clutch control.

FIG. 4 shows a detailed section view of the pressure plate actuator 2 and clutch plate assembly 3 for the motorcycle. In FIG. 4, the engine 5 (not shown) is connected by drive shaft 32 and rotary gear 13 to driven gear 15 and an alternating series of clutch plates 28 and clutch discs 27. Pressure plate actuator 2, comprising movable diaphragm disc 17 surrounded by rubber rim 16, moves back and forth (right to left and vice versa in FIG. 4) to engage or disengage the clutch pressure plate 20 of clutch plate assembly 3 as the case may be. The pressure plate actuator 2 position is controlled by the degree of air pressure in housing 14 as delivered by hose 9, which in turn is controlled by valve 7. The position of valve 7 can be directly or indirectly controlled according to throttle position, engine RPM, engine load, or other sensible factors.

As seen in FIG. 4, hose 9 delivers compressed air to the interior of housing (cover plate) 14 through air inlet fitting 31. When the pressure reaches a certain prescribed level, the compressed air forces diaphragm disc 17 to move to the left. This is possible because rim 16 is constructed of resilient rubber and permits diaphragm disc 17 to move back and forth. When disc 17 moves to the left, guide pin 23 and release bearing 26 (which are affixed to diaphragm 17 by washers 25 and 24) moves into hole 22 and rim 21, which are located in the centre of clutch pressure plate 20 (see FIG. 3). Pressure plate 20 forces the series of discs 27 and plates 28 in clutch housing 29 to contact one another to thereby provide a positive connection between the engine and the transmission via drive shaft 32, drive gear 13, driven gear 15 and transmission shaft 30. The opposite process takes place when air pressure in housing cap 14 is cut off by valve 7, thereby enabling actuator 2 (disc 17) to retreat, and disengage from clutch pressure plate 20. Clutch discs 27 and clutch plates 28 then disengage.

Figure 5:
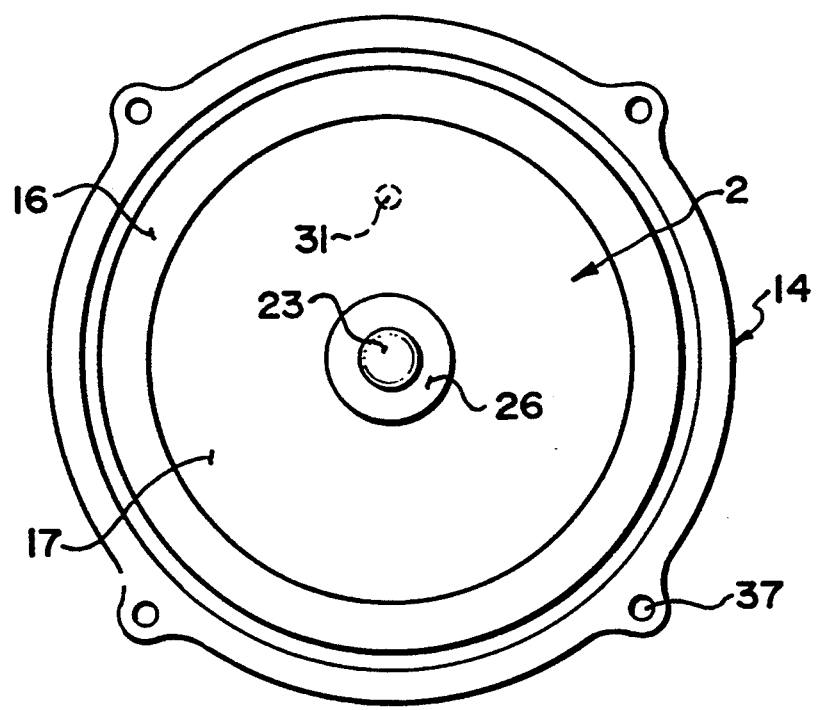
FIG. 5 illustrates an inside view of a clutch plate housing with the pressure plate actuator.

FIG. 5 illustrates a front inside view of the housing plate 14, which shows the circular disc (diaphragm) 17 peripherally surrounded by the rubber rim 16. Guide pin 23 and release bearing 26 are also visible in the centre of the disc 17. Bolt holes 37 around the periphery of the housing 14 enable it to be bolted to the clutch housing 29 (see FIG. 4). An air inlet hole which receives fitting 31 is also visible by dotted lines in FIG. 5.

Figure 6:
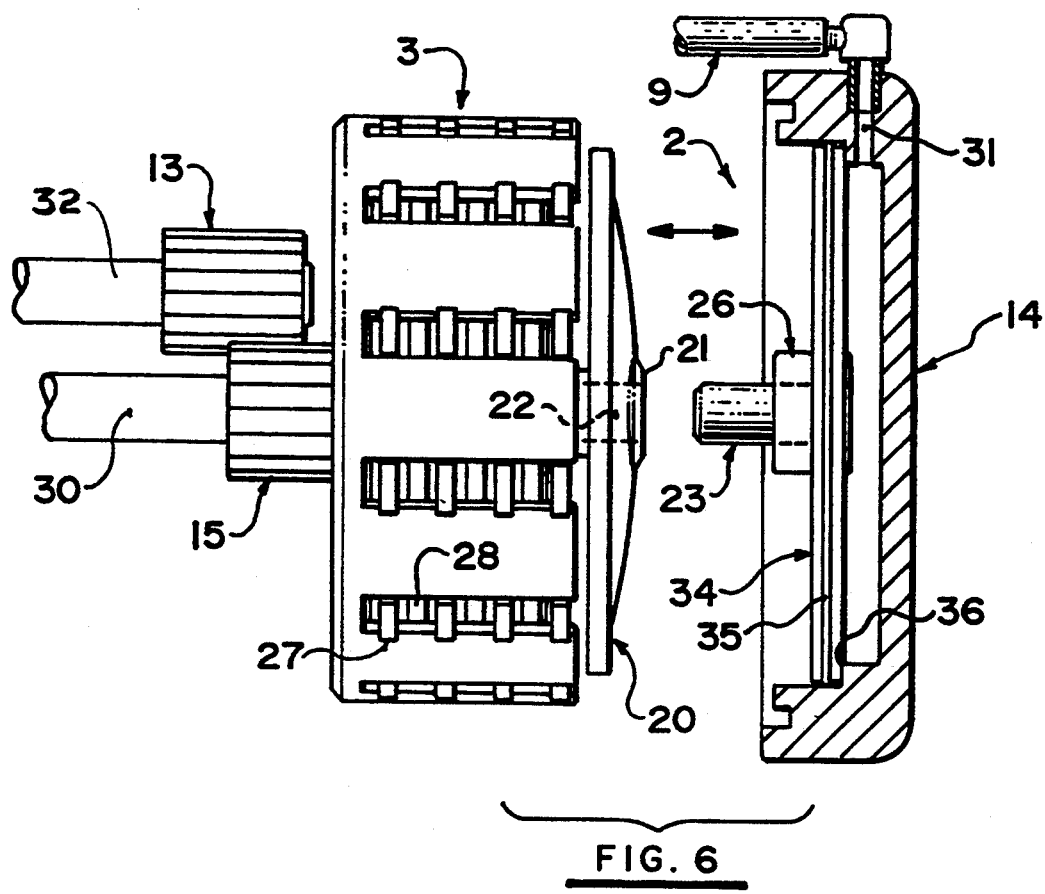
FIG. 6 illustrates a detail section view of a motorcycle clutch plate assembly and pressure plate (ram) actuator assembly of the motorcycle automatic clutch control.

FIG. 6 illustrates a detailed section view of an alternative design of pressure plate actuator 2-clutch plate 3 assembly as shown generally in FIG. 2. Engine shaft 32 and drive gear 13 are connected to driven gear 15 and shaft 30, which in turn are connected to and rotate with clutch assembly 3, which is engaged when the alternating series of clutch discs 27 and clutch plates 28 are compressed together by pressure plate 20. Guide pin 23, which is connected to release bearing 26, travels left, when housing 14 is pressured through hose 9 to engage in guide hole 22 of pressure plate 20. Alternatively, it travels to the right to disengage the clutch actuator 2 from the clutch pressure plate 20 when housing 14 is depressurized. The guide pin 23 and release bearing 26 are moved by ram 34 which is a planar plate which has a sealing O-ring 35 around its circumference. Ram 34 backs against support ledge 36 when housing 14 is depressurized, thereby ensuring a space between ram 34 and housing cover plate 14. Ram 34 and O-ring 35 function in the same manner as diaphragm disc 17 (see FIG. 4) which is connected around its periphery by a flexible rim 16 to the housing 14. The ram 34 or diaphragm 17 are moved back and forth by inflating or deflating the air cavity between the housing 14 and the ram 34 or diaphragm 17, as described above and previously regarding FIGS. 4 and 5.

Figure 7:
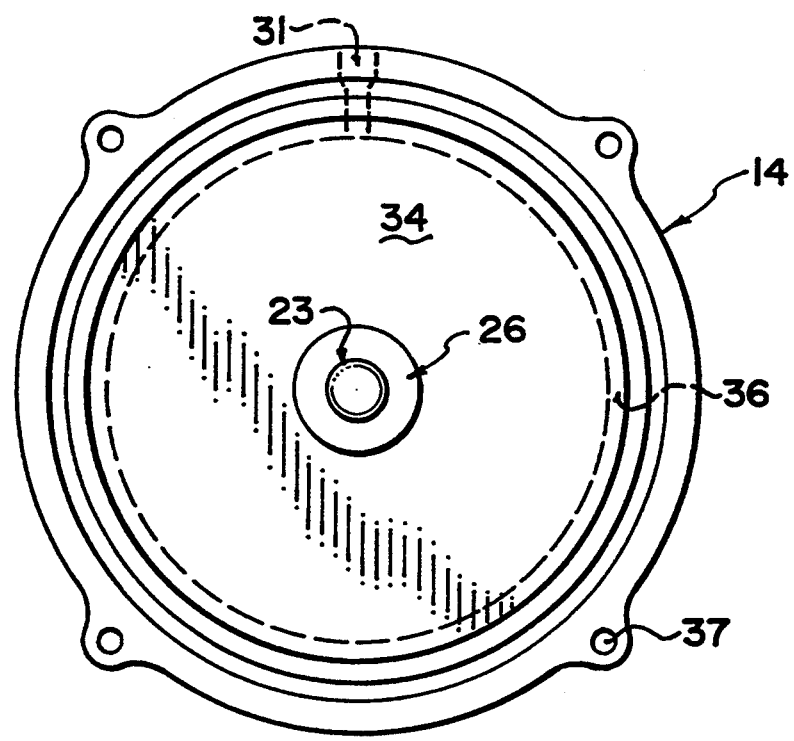
FIG. 7 illustrates a front view of the inside of a motorcycle clutch cover plate showing the ram pressure plate actuator assembly.

FIG. 7 illustrates a front inside view of the ram 34, guide pin 23, release bearing 26 and housing 14 assembly. The housing 14 is generally cylindrical and hollow in shape and has bolt holes 37 around its periphery. These holes 37 align with the holes in the main central housing 29 connected to the engine 5 and transmission and enable the housing cover 14 to be fastened securely and air tight against the housing 29.

Figure 8:
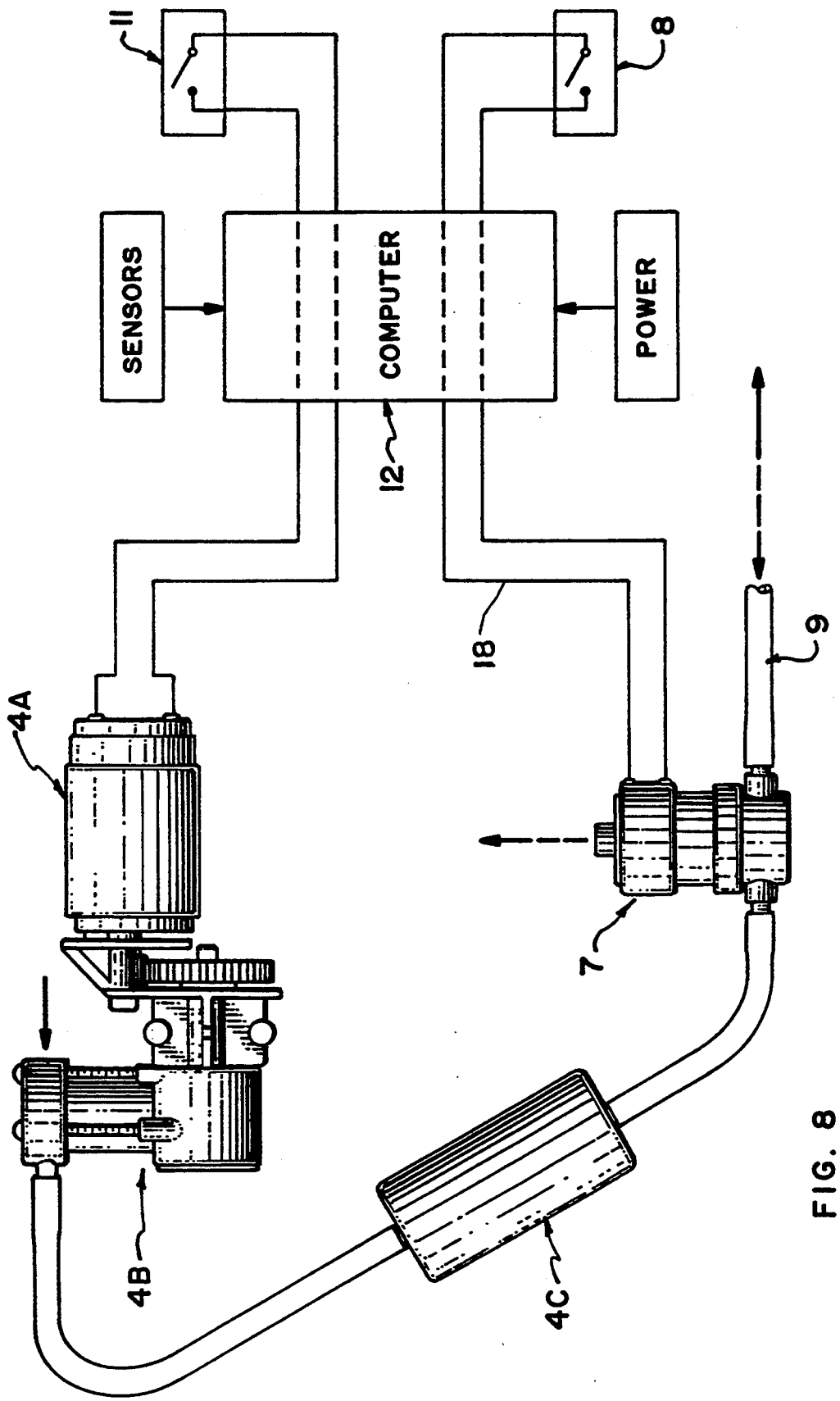
FIG. 8 illustrates a detailed isometric view of a motor, pneumatic air pump, reservoir, solenoid valve, and throttle activation switch, connected together.

FIG. 8 illustrates a detailed view of the air motor 4a, air pump 4b and reservoir 4c, which are shown generally in FIG. 2. The computer 12 and solenoid valve 7 are also shown, along with switch 8. Electrical wires 18 connect the switch 8 to the solenoid valve 7. Air hose 9 connects the valve 7 to the housing 14 and delivers compressed air to the housing 14. Electrical wires connect solenoid valve 7 to the battery (not shown).

Figure 9:
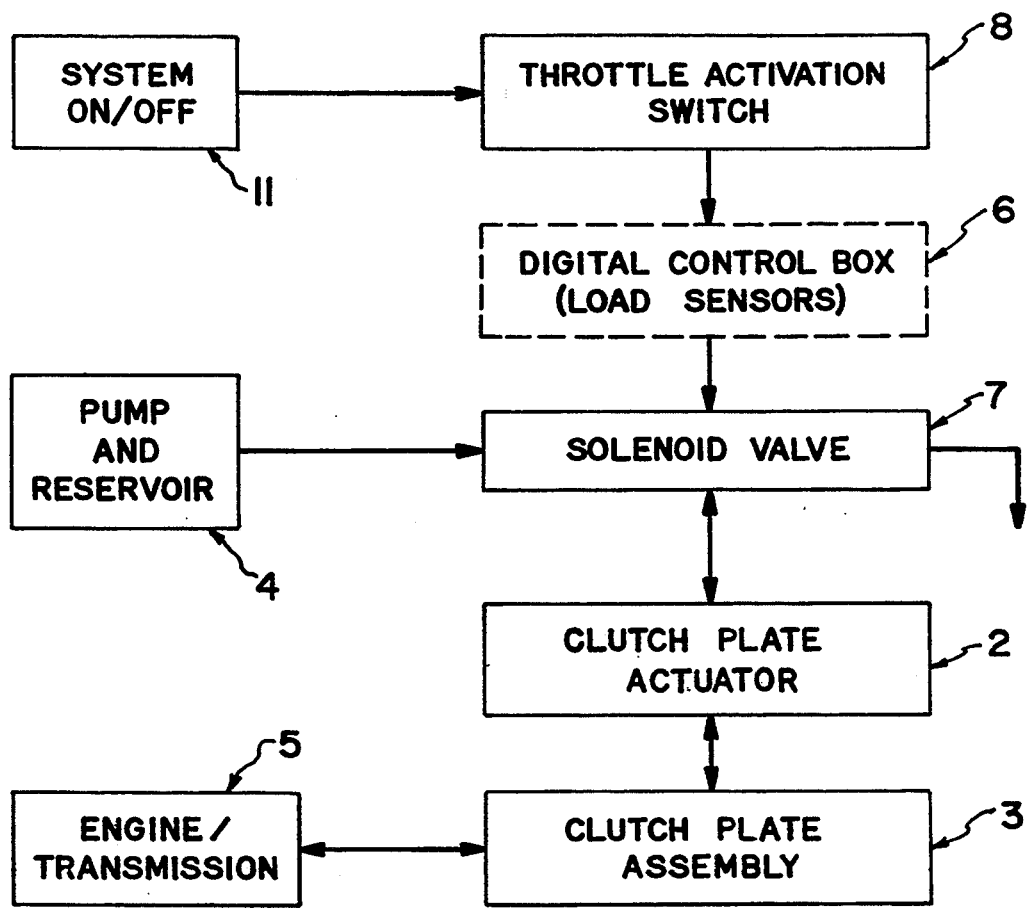
FIG. 9 illustrates a schematic flow diagram of the electro-mechanical components of the automatic clutch control.

FIG. 9 illustrates a schematic diagram of the main electrical and mechanical components of the automatic clutch control system related to throttle position. When the throttle 10 (not shown) is open (on), electrical current from the power supply (not shown, but typically an alternator or battery) passes through opened on/off switch 11 to a throttle position activation switch 8. Switch 8 may be a microswitch or a simple on/off switch. The latter is more durable. However, a microswitch can provide smoother operation between open and closed positions. The switch 8 is typically positioned under the throttle handle 10 (as shown in FIG. 1). The electrical current then passes through switch 8 to the solenoid valve 7 to cause it to open. Air pressure from a compressor/reservoir 4c is delivered to the clutch plate actuator 2 which engages the clutch pressure plates 3 with engine 5 and the transmission. This action can also be conventionally programmed to start the motor 4a and pump 4b or a compressor (optional) to bring the air pressure back to a predetermined level. An optional conventional engine load sensor associated with a conventionally programmed digital control box (see FIG. 2) can be connected between the activation microswitch 8 and the valve 7. The engine load or engine speed sensors associated with the sensor control box 6 sense the load on or the speed of the engine 5 and provide a refinement or an alternative in controlling the solenoid valve 7 and the position of the clutch pressure plate actuator 2. These refinements or alternatives permit immediate engagement or disengagement or adjustment of the clutch engagement and slip in relation to the load being carried by the engine 5, or engine speed, and prevent the engine 5 from stalling or bogging if the engine speed is unduly reduced or the load is greater than the engine 5 can handle.

When the throttle 10 (not shown) is controlling and is closed (off), electrical power from the power supply is cut off by switch 8. The switch 8 interrupts electrical current to the solenoid of valve 7 which causes the valve 7 to close. The air pressure in hose 9 and housing 14 drops which then causes actuator 2 to retreat and disengage from pressure plate 20 and the clutch plate assembly 3. The computer 12 can be programmed to have the air pressure in reservoir 4c recharged at this stage by activating motor 4a and air pump 4b. This prepares the system for the next clutch engagement cycle.

Figure 10:
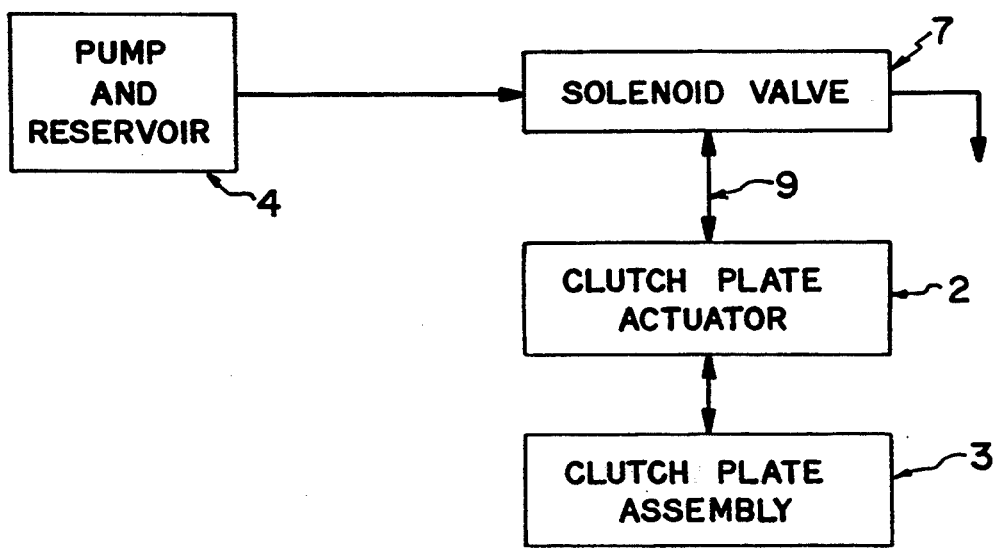
FIG. 10 illustrates a schematic flow diagram of the pneumatic operation of the automatic clutch control.

FIG. 10 shows a schematic diagram of the air flow pattern of the automatic clutch control with the throttle closed or open. The clutch plate assembly 3 through clutch plate actuator 2 controls the transfer of power from an engine (not shown) to a transmission (not shown). The pump and reservoir 4 activate the clutch plate assembly 3 by applying air pressure through open valve 7 to the pressure plate actuator 2. The position of the solenoid valve 7 controls the air flow rate to and from the pump and reservoir 4. The air supply is obtained from an air pump 4b and electrical motor 4a (not shown but see FIG. 2). When valve 7 is closed, air escapes from the system to atmosphere and pressure plate actuator 2 disengages from the clutch plate assembly 3. When valve 7 is open, air passes through hose 9 to pressure plate actuator 2 which in turn moves against clutch plate assembly 3 to engage it.

FIG. 11 illustrates a side partial-section view of the invention in relation to a standard manual clutch transmission for a vehicle such as an automobile or truck. FIG. 11 depicts the vehicle engine 90 with a conventional flywheel 92 connected to its crankshaft 91. A bell housing 94 encloses a standard clutch disk 96 adjacent the flywheel 92. The disk 96 is backed by a ram and thrust bearing 98. The ram 98 as regulated by air pressure (or optionally hydraulic pressure) can move to the left or right. Pressure can be regulated according to throttle position, engine speed, or engine load, or other engine operating variables. In its left-most position (when pressurized), ram 98 causes the clutch disk 96 to engage the flywheel 92 and rotate with the flywheel. The end of the bell housing 94 opposite the engine 90 is connected to a manually operated transmission 99. An air inlet 100 is formed in the bell housing 94 and enables the air on the transmission side of the ram 98 in the housing 94 to be pressurized as required to thereby force the ram 98 to press the disk 96 against the rotating flywheel 92. When pressure on the ram 98 is relieved, then the ram 98 and the clutch disk 96 move away from the flywheel 92, thereby interrupting the transport of rotary power to the transmission.

FIG. 12 illustrates an end view of the bell housing 94 and shows a detail of a ram 98, thrust bearing 98A, transmission input shaft 102 and air inlet 100. The interior of the bell housing 94 acts as a cylinder for the pneumatic ram 98. The thrust bearing 98A via the ram 98 applies thrust to the clutch disk 96 when air enters the housing through inlet 100 thereby moving the ram 98 forward. The clutch disk 96 is then engaged with the rotating flywheel 92. The clutch disk 96 is disengaged from the flywheel 92 when air pressure to the housing 94 is reduced or terminated by cutting off the air supply through inlet 100.

FIG. 13 depicts a detailed exploded side view of a ram 98, thrust bearing 98A, clutch disk 96 and flywheel 92. The ram 98 has a pair of O-rings 104 around its circumference to seal the ram 98 inside the bell housing 94, and thereby enable air pressure to be built up as required on the side of the ram 98 removed from the clutch disk 96.

FIG. 14 illustrates a detailed section view of a ram 98 with grooves 106 for the O-rings (not shown) and an internal shaft hole 108 with a pair of O-ring seals 110. The ram 98 slides back and forth on input shaft 102.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. An apparatus for automatically controlling the position of a pressure actuated single plate or multiple plate clutch in a housing between a power source and a drive train of a vehicle which has a manual transmission comprising:
    (a) a power source mounted in the vehicle for driving the vehicle;
    (b) a drive train with a manual transmission, said drive train associated with the power source for driving the vehicle;
    (c) a single plate or multiple plate clutch mounted on the vehicle between the power source and the drive train, the clutch connecting the power source with the drive train;
    (d) a clutch engaging means which engages the clutch when positive pressure is applied to the clutch engaging means and disengages the clutch when positive pressure is withdrawn from the clutch engaging means;
    (e) pneumatic, hydraulic or electrically activated pressure source means mounted on the vehicle, the pressure source means being driven by the power source;
    (f) computer means for sensing a performance variable of the power source;
    (g) throttle means for controlling the power output from the power source;
    (h) manual transmission means, coupled to the clutch engaging means, for engaging gear shifting when positive pressure is withdrawn from the clutch enabling means;
    (i) a control means which regulates pneumatic, hydraulic or electrically activated pressure generated by the pneumatic, hydraulic, or electrically activated positive pressure source means to the clutch engaging means according to the computer means sensed performance variable of the power source; and
    (j) a control valve wherein the pressure to the clutch engaging means is controlled through the control valve between the pneumatic, hydraulic or electrically activated pressure source means and the clutch engaging means, which control valve is opened or closed according to the computer sensed performance variable of the power source.

2. An apparatus as claimed in claim 1 wherein the clutch is a multiple plate clutch and the clutch engaging member comprises a cover plate and a movable member which are attached to the housing of the multiple plate clutch, the movable member being positioned adjacent to the multiple plate clutch, the cover plate and the movable member providing an enclosed sealed chamber to which pressure is supplied from an air compressor, fluid pressure source, or an electrically activated pressure source to engage the multiple plate clutch.

3. An apparatus as claimed in claim 1 wherein the performance variable of the power source is sensed by an electronic power source variable sensor which is connected to a programmed micro computer.

4. An apparatus as claimed in claim 1 wherein the pressure to the clutch engaging member is air pressure which is controlled through a valve between an air compressor mounted on the vehicle and the clutch engaging member which valve is opened or closed according to computer sensed performance of the power source.

5. An apparatus as claimed in claim 4 wherein the valve is an electrically operated solenoid valve, with electricity to the valve being provided by an electrical power source generator mounted on the vehicle.

6. An apparatus as claimed in claim 5 wherein the electricity to the solenoid valve is regulated by a switch which senses position of the throttle means controlling the power source.

7. An apparatus as claimed in claim 6 wherein the switch is an electrical activation switch.

8. An apparatus as claimed in claim 6 wherein air pressure is maintained by an air compressor which operates when the air pressure in the housing falls below a prescribed level.

9. An apparatus as claimed in claim 1 wherein the power source is a motorcycle engine and performance of the power source is determined by an engine speed sensor which is linked to the control, and the clutch engaging means causes the clutch to engage when speed of the engine reaches a predetermined level.

10. An apparatus as claimed in claim 8 wherein the clutch engaging means is a clutch pressure plate actuator which disengages the clutch from the power source when pressure to the clutch pressure plate actuator is interrupted by the control.

11. An apparatus as claimed in claim 10 wherein the clutch engages with the power source when the control permits air pressure to activate the clutch pressure plate actuator.

12. An apparatus as claimed in claim 6 including a gear shift member and a switch that senses gear shift member position and controls the solenoid valve position.

13. An apparatus as claimed in claim 4 wherein pressure to the clutch engaging means is controlled according to load on the power source.

14. An apparatus as claimed in claim 1 including a programmed computer control which regulates clutch engagement or disengagement according to position of the throttle means regulating the power source, the control means regulating air pressure generated by an air compressor mounted on the vehicle to the clutch engaging means adjacent to the clutch, the clutch engaging means comprising a cover plate and a moveable member which are attached to a housing of the clutch, the moveable member being positioned adjacent to the clutch, the cover plate and the moveable member providing an enclosed sealed chamber to which air under pressure is supplied from the air compressor, the air pressure to the clutch engaging means being controlled through a valve between the air compressor and the clutch engaging means, which valve is opened or closed according to the computer sensed performance of the power source which is a rotary power source.

15. An apparatus as claimed in claim 1 wherein hydraulic pressure is applied to the clutch engaging means, the hydraulic pressure being generated by a hydraulic pressure source.

16. An apparatus as claimed in claim 1 wherein the electrically activated pressure is generated by an electrical motor means mounted on the vehicle.

17. An apparatus as claimed in claim 1 wherein pressure on the clutch is generated by a hydraulic, pneumatic or electrical pressure ram.

18. An apparatus as claimed in claim 14 wherein the control regulates clutch engagement or disengagement according to rotational speed of the power source.

19. An apparatus as claimed in claim 14 wherein the control regulates clutch engagement or disengagement according to load applied to the power source.

20. An apparatus as claimed in claim 1 wherein the clutch is a single plate clutch.

21. An apparatus as claimed in claim 1 wherein the clutch is a multiple plate clutch.

* * * * *